United States Patent [19]

Lew

[11] Patent Number: 4,911,019

[45] Date of Patent: * Mar. 27, 1990

[54] HIGH SENSITIVITY-HIGH RESONANCE FREQUENCY VORTEX SHEDDING FLOWMETER

[76] Inventor: Hyok S. Lew, 7890 Oak St., Arvada, Colo. 80005

[*] Notice: The portion of the term of this patent subsequent to Mar. 1, 2005 has been disclaimed.

[21] Appl. No.: 133,315

[22] Filed: Dec. 16, 1987

Related U.S. Application Data

[63] Continuation of Ser. No. 925,084, Oct. 30, 1986, abandoned, which is a continuation of Ser. No. 12,680, Feb. 9, 1987, Pat. No. 4,803,870, which is a continuation of Ser. No. 31,902, Mar. 30, 1987, Pat. No. 4,807,481, which is a continuation of Ser. No. 105,265, Oct. 7, 1987, Pat. No. 4,879,909.

[51] Int. Cl.$^4$ ............................................. G01F 1/32
[52] U.S. Cl. ............................... 73/861.24; 73/861.22
[58] Field of Search ............ 73/861.04, 861.22, 861.24

[56] References Cited

U.S. PATENT DOCUMENTS

| | | | |
|---|---|---|---|
| 3,116,639 | 1/1964 | Bird | 73/861.24 |
| 4,048,854 | 9/1977 | Herzl | 73/861.04 |
| 4,069,708 | 1/1978 | Fussell, Jr. | 73/861.24 |
| 4,181,020 | 1/1980 | Herzl | 73/861.24 |
| 4,727,756 | 3/1988 | Lew | 73/861.24 |

*Primary Examiner*—Hezron E. Williams
*Assistant Examiner*—Robert P. Bell

[57] ABSTRACT

This invention discloses a vortex sensor for detecting vortices generated by a bluff body immersed in a fluid stream, which vortex sensor comprises an elongated or planar member receiving fluid dynamic forces associated with the vortices and a transducer connected thereto, wherein at least one extremity of the elongated or planar member is secured to the wall structure of the flow passage, while the other unsecured extremity of the elongated or planar member or an extension thereof is connected to the force receiving member of a transducer. The secured extremity of the elongated or planar member contributes to a high resonance frequency thereof well above the vortex shedding frequency ranges, while the other unsecured extremity contributes to a high sensitivity in the vortex sensing as that extremity connected to the transducer transmits all of the stress and/or strain generated by the fluid dynamic forces associated with the vortices to the force receiving member of the transducer.

13 Claims, 4 Drawing Sheets

HIGH SENSITIVITY-HIGH RESONANCE FREQUENCY VORTEX SHEDDING FLOWMETER

This application is a continuation in part of application Ser. No. 06/925,084 filed 10/30/86, now abandoned, and application Ser. No. 07/012,680 filed 2/8/87, now U.S. Pat. No. 4,803,870, and application Ser. No. 07/031,902, filed 3/30/87 now U.S. Pat. No. 4,807,481, and application Ser. No. 07/105,265, filed 10/7/87 now U.S. Pat. No. 4,879,909.

BACKGROUND OF THE INVENTION

This patent application is a continuation-in-part to patent application Ser. No. 06/925,084 entitled "Vortex Shedding Flowmeter with Swivel Stress Transmitter" filed on Oct. 30, 1986; Ser. No. 07/012,680 entitled "Vortex Shedding Flowmeter with Mechanically Amplifying Pressure Sensor" filed on Feb. 9, 1987; Ser. No. 07/031,902 entitled "Three-in-one Vortex Shedding Flowmeter" filed on Mar. 30, 1987; and Ser. No. 07/105,265 entitled "Vortex Shedding Flowmeter" filed on Oct. 7, 1987.

The phenomena of the vortex shedding from a bluff body immersed in the fluid stream occur at Reynolds numbers greater than a few hundred in a clear and regular manner, where the Reynolds number is defined as the product of the bluff body width and the fluid velocity divided by the kinematic viscosity of the fluid. For the Reynolds number greater than 1,000 and less than 400,000, the vortex shedding frequency is linearly proportional to the fluid velocity and the amplitude of the alternating lift forces on a wing placed downstream to the bluff body is proportional to the dynamic pressure of the moving fluid medium, which dynamic pressure is defined as one half of the fluid density times the square of the fluid velocity. The vortex shedding phenomena provides the physical principles for designing a flowmeter that determines: (1) the fluid velocity by measuring the vortex shedding frequency; and (2) the dynamic pressure by measuring the amplitude of the alternating lift forces on the wing sensor in the Reynolds number range greater than 1,000 and less than 400,000, which range is equivalent to the air flows under the standard condition faster than a few feet per second and the water flows faster than a fraction of a foot per second. The existing art of the flowmeter employing the vortex shedding principles only measures the fluid velocity based on the vortex shedding frequency for air flows faster than 25-30 feet per second and water flows faster than 1-2 feet per second, which indicates that the level of the existing art in the vortex shedding flowmeter technology is at an infantile stage.

BRIEF SUMMARY OF THE INVENTION

The primary object of the present invention is to provide a vortex shedding flowmeter capable of measuring air flows faster than a few feet per second instead of the minimum velocity of 20-30 feet per second in the existing art and water flows faster than a fraction of a foot per second instead of 1-2 feet per second in the existing art.

Another object is to provide a vortex shedding flowmeter measuring the combination of the fluid velocity and the dynamic pressure or the combination of the volume flow and mass flow.

A further object is to provide a vortex shedding flowmeter including a calibrating means for checking the validity of the dynamic pressure measurements on a real time basis.

Yet another object is to provide a vortex shedding flowmeter comprising a vortex detecting wing sensor disposed downstream to the vortex shedding bluff body, which is secured to the wall of the flow passage at one extremity and connected to the force receiving member of a transducer by a mechanical coupling at the other extremity.

Yet a further object is to provide a vortex shedding flowmeter with a vortex detecting wing sensor secured to the wall of the flow passage at both extremities and connected to the force receiving member of a transducer by an extension extending from a midsection of the vortex detecting wing sensor.

Still another object is to provide a vortex shedding flowmeter with a vortex sensing wing sensor secured to the wall of the flow passage at at least one extremity and connected to the force receiving member of a transducer, which force receiving member includes surface area generating lift forces in conjunction with the vortex sensing wing.

Still a further object is to provide a vortex shedding flowmeter with a two piece bluff body connected to one another at a midsection thereof by a mechanical coupling, wherein the first of the two pieces is secured to the wall of the flow passage and the second of the two pieces is connected to a transducer.

Yet still another object is to provide a vortex shedding flowmeter with one piece bluff body secured to the wall of the flow passage at one extremity and connected to the force receiving member of a transducer by a mechanical coupling at the other extremity.

Yet still a further object is to provide a vortex shedding flowmeter with a bluff body that includes a pressure detecting panel contained within a cavity in the bluff body wherein the two sides of the panel are respectively exposed to the fluid pressures on the two sides of the bluff body by means of a plurality of pressure communicating openings.

These and other objects of the present invention will become clear as the description thereof progresses.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
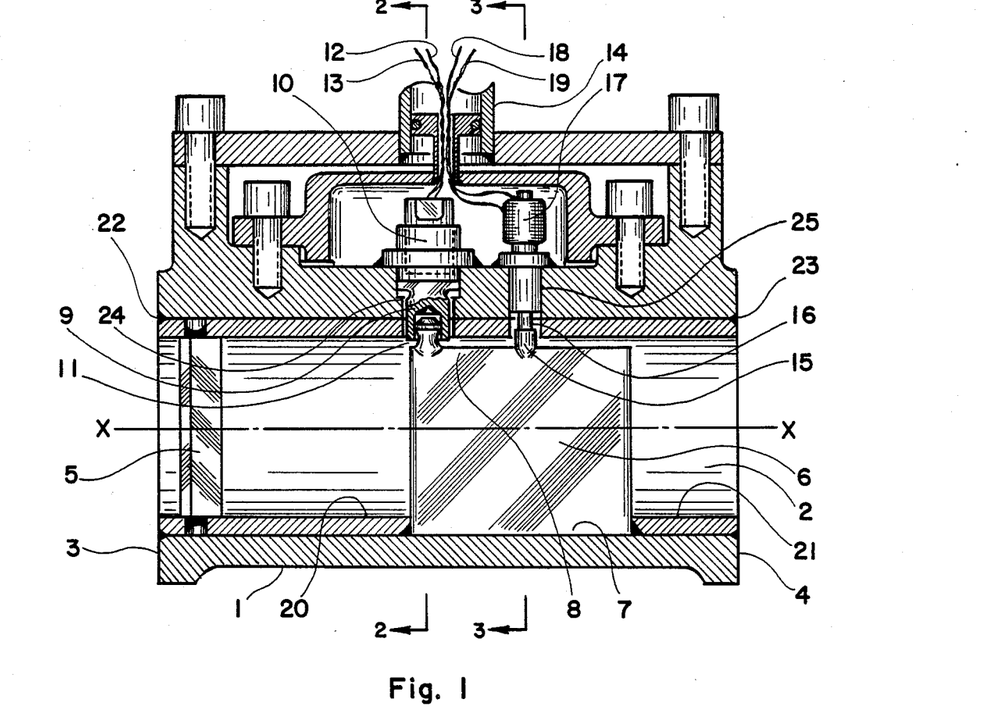
FIG. 1 illustrates a cross section of an embodiment of the present invention including calibration means that establishes the accuracy in measuring the amplitude of the dynamic pressure fluctuation created by the vortex shedding phenomena.

In FIG. 1 there is illustrated a cross section of an embodiment of the vortex shedding flowmeter of the present invention. The flowmeter body 1 includes a flow passage 2 extending from one extremity to the other extremity, which extremities include means for connecting to a pipe line such as the flange faces 3 and 4. A bluff body 5 of a cylindrical shape having a blunt side surface facing the upstream direction is diaposed across a first cross section of the flow passage 2, wherein the two extremities of the bluff body 5 is anchored to the wall of the flow passage. A vortex detecting wing sensor of a planar construction 6 is disposed across a second cross section of the flow passage 2 in a generally parallel relationship with respect to the bluff body 5, which vortex detecting wing 6 is secured to the wall of the flow passage at one extremity 7 thereof, while the other unsecured extremity 8 is connected to a force receiving member 9 extending from a transducer container vessel 10 by a mechanical coupling 11, wherein the transducer container 10 is affixed or secured to the flowmeter body 1. While the preferred type of the mechanical coupling 11 is a socket joint providing a minimum resistance against the bending at the coupling point, any other mechanical coupling such as a threaded, pressure-fit or wedge-in type coupling is acceptable as long as the coupling provides a slender section at the coupling point, which allows a bending at the coupling point without posing a stiff resistance thereagainst and experiencing a structural failure thereof. The electric wires 12 and 13 extending from the transducer element enclosed in the container vessel 10 is routed through a conduit 14 and connected to a preamplifier (not shown) that amplifies and filters the electric signals generated by the transducer element. The unsecured extremity 8 of the vortex detecting wing sensor 6 includes a ferromagnetic element 15 affixed thereto, which is disposed at a laterally close proximity to the core 16 of a calibration electromagnet 17 that is energized by electric currents supplied through the two electric wires 18 and 19 routed through the conduit 14. When the mechanical coupling 11 is a simple joint such as a flexible socket or swivel type, the extremity 7 of the wing sensor 6 should be fixedly secured to the wall of the flow passage 2 by such means as welding or threaded anchoring. If the mechanical coupling 11 is a fixed joint such as a tight-fitting socket or threaded joint, the extremity 7 of the wing sensor 6 may be simply secured to the wall of the flow passage 2 by such means as swivels or hinges. In actual construction of the flowmeter, the flowmeter body 1 includes a bore 20 that receives an insertion tubing 21 in a tight or close tolerance relationship, which insertion tubing includes the bluff body 5 and the wing sensor 6 preassembled there-with. The insertion tubing 21 is secured to the flowmeter body 1 by weldings 22 and 23. The force receiving member 9 of the transducer assembly 10 including the first half of the mechanical coupling 11 extends through a hole 24 disposed through the flowmeter body 1 and wall of the insertion tubing 21 and engages the second half of the mechanical coupling 11 affixed to the unsecured extremity 8 of the wing sensor 6, whereupon the transducer container vessel 10 is welded or anchored to the flowmeter body. The core 16 of the calibration electromagnet 17 extends through another hole 25 disposed through the flowmeter body 1 and the wall of the insertion tubing 21 and is terminated at a laterally close proximity to the ferromagnetic element 15. affixed to the unsecured extremity 8 of the wing sensor 6, whereupon the core of the electromagnet is anchored to the flowmeter body by welding or threaded fastening.

Figure 2:
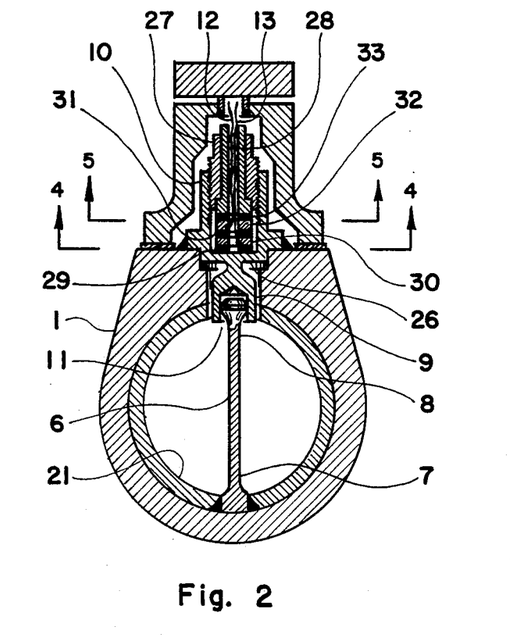
FIG. 2 illustrates another cross section of the embodiment shown in FIG. 1.

In FIG. 2 there is illustrated another cross section of the vortex shedding flowmeter shown in FIG. 1, which cross section is taken along plane 2—2 as shown in FIG. 1. The transducer container vessel 10 has a closed end comprising a thin flange 26 from which the force receiving member 9 extends. The open end of the transducer container vessel 10 is threadedly engaged by a plug 27 that presses the transducer holder 28 towards the thin flange 26. The holder 28 compresses the transducer pack against the thin flange 26, which transducer pack includes a first Piezo electric disc 29, a first conductor disc 30, an insulator disc 31, a second conductor disc 32 and a second Piezo electric disc 33.

Figure 3:
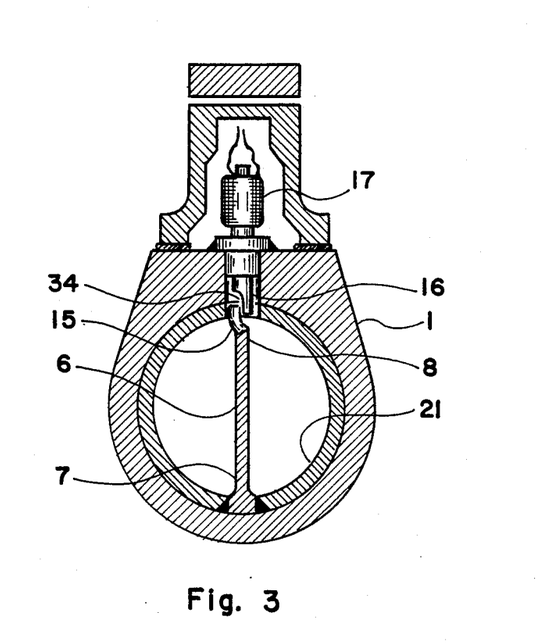
FIG. 3 illustrates a further cross section of the embodiment shown in FIG. 1.

In FIG. 3 there is illustrated a further cross section of the vortex shedding flowmeter shown in FIG. 1, which cross section is taken along plane 3—3 as shown in FIG. 1. The ferromagnetic element 15 affixed to the unsecured extremity 8 of the wing sensor 6 is laterally separated from the tip of the core 16 of the calibration electromagnet 17 by a narrow gap 34.

Figures 4, 5, 6, 7, 8, 9, 10, 11, 12:
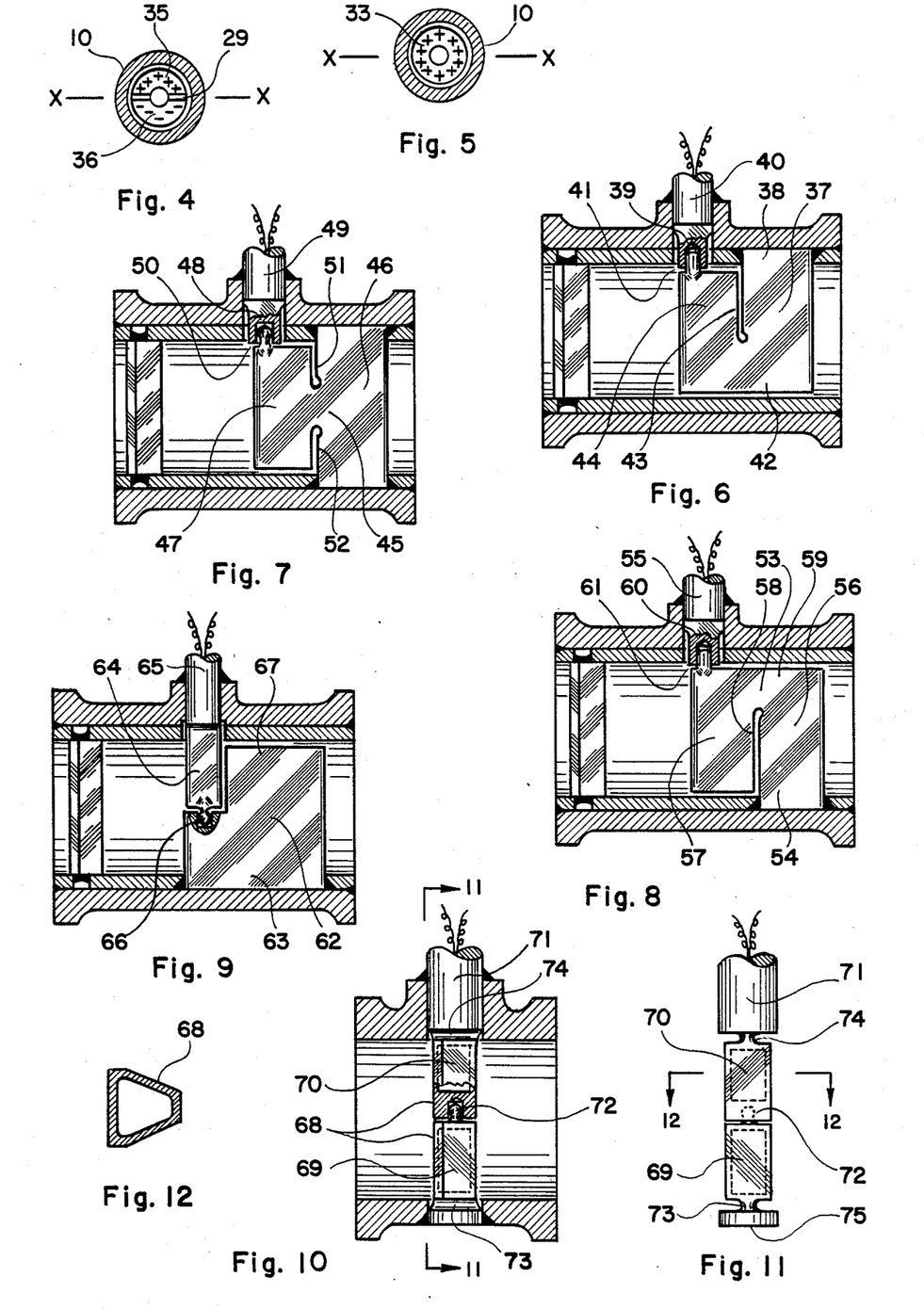
FIG. 4 illustrates a cross section of the transducer shown in FIG. 2.
FIG. 5 illustrates another cross section of the transducer shown in FIG. 2.
FIG. 6 illustrates an embodiment of the vortex shedding flowmeter of the present invention that includes a slitted vortex sensing wing secured at one extremity.
FIG. 7 illustrates an embodiment of the vortex shedding flowmeter of the present invention that includes a slitted vortex sensing wing secured at both extremities.
FIG. 8 illustrates an embodiment of the vortex shedding flowmeter of the present invention that includes a slitted vortex sensing wing secured at one extremity opposite to the extremity connected to a transducer.
FIG. 9 illustrates an embodiment of the vortex shedding flowmeter of the present invention including two vortex detecting wings coupled to one another by a mechanical coupling, wherein the first wing is secured to the wall of the flow passage and the second wing is connected to a transducer.
FIG. 10 illustrates an embodiment of the vortex shedding flowmeter of the present invention including two piece bluff body including a mechanical coupling at the midsection thereof wherein the first piece is secured to the wall of the flow passage and the second piece is connected to a transducer.
FIG. 11 illustrates another view of the two piece bluff body shown in FIG. 10.
FIG. 12 illustrates the cross section of the hollow bluff body shown in FIG. 11.

In FIG. 4 there is illustrated a cross section of the transducer pack shown in FIG. 2, which cross section is taken along plane 4—4 as shown in FIG. 2. The first Piezo electric disc 29 has two oppositely polarized halves 35 and 36 disposed in a mirror image to one another about a plane including the central axis X—X of the flow passage. Both halves 35 and 36 of the first Piezo electric disc are in contact with the first conductor disc 30 from which one of the two electrical wires 12 and 13 extends and with the thin flange 26.

In FIG. 5 there is illustrated another cross section of the transducer pack shown in FIG. 2, which cross section is taken along plane 5—5 as shown in FIG. 2. The two halves of the second Piezo electric disc 33 have the same polarization and in contact with the second conductor disc 32 from which the other of the two electrical wires 12 and 13 extends and with the end face of the holder 28, which Piezo electric disc 33 is disposed symmetrically about a plane including the central axis X—X of the flow passage. It should be mentioned that the particular embodiment of the transducer pack illustrated in FIGS. 2, 4 and 5 is only one of many preferred embodiment. For example, the first Piezo electric disc may have only one half polarized instead of the two oppositely polarized halves. The present invention is not limited to the particular embodiment of the transducer described in conjunction with the illustrated embodiment or to the particular type of the transducer shown.

The bluff body 5 generates a train of vortices shed from the two sides thereof in an alternating pattern at frequencies directly proportional to the fluid velocity in a Reynolds number range greater than 1,000 and less than 400,000, which train of vortices produces alternating lift forces on the wing sensor 6 at the same frequency as the ovrtex shedding frequency. The amplitudes or peak-to-peak values of the alternating lift forces on the wing sensor 6 is directly proportional to the dynamic pressure of the fluid flow which is equal to one half of the fluid density times the square of the fluid velocity. The alternating lift forces on the wing sensor 6 alternately compress and decompress the two oppositely polarized halves 35 and 36 of the first Piezo electric disc 29 and generate alternating electromotive forces therefrom at the vortex shedding frequency. The alternating lift forces do not generate any electromotive force from the second Piezo electric element 33 having two identically polarized halves. The mechanical vibration of the flowmeter body compresses the two havles of the Piezo electric discs equally, which generates electromotive forces from the second Piezo electric element 33, while it does not generate any electromotive forces from the first Piezo electric disc 29. In actuality, due to imperfection in the electrical polarizations and in the mechanical symmetry between the two halves of the Piezo electric discs, the first Piezo electric disc 29 generates electromotive forces which are mostly vortex signals with a minor amount of mechanical vibration noises, while the second Piezo electric disc 33 generates electromotive forces which are mostly mechanical vibration noises. The two electromotive forces from the two Piezo electric discs 29 and 33 are combined in such a way that the mechanical vibration noises are canceled therebetween and nearly pure vortex signals are extracted. By processing the refined vortex signals from the transducer, the vortex shedding frequency and the amplitudes or peak-to-peak value thereof are determined. Once the constant of the proportionally between the fluid velocity and the vortex shedding frequency is determined by calibrating the flowmeter, the fluid velocity is determined as a product of the porportionality constant and the frequency of the refined alternating electromotive forces from the transducer. The actual functional relationship between the dynamic pressure of the fluid flow and the amplitude of the refined alternating electromotive forces from the transducer is determined by calibrating the flowmeter. The dynamic pressure of the fluid flow is determined from the amplitude of the refined alternating electromotive forces from the transducer. Due to the drift in the characteristics of the electronic circuits processing the signals from the transducer and of the mechanical coupling between the wing sensor and the transducer container vessel, the constants included in the functional relationship between the magnitude of the dynamic pressure of the fluid flow and the amplitude of the refined electrical signals can change. The calibration electromagnet 17 energized by pulsed electric currents exerts lateral forces of known magnitude on the wing sensor 6, which generate pulsed electromotive forces from the transducer. By taking the ratio of the magnitudes between the input currents to the calibration electromagnet 17 and the output electromotive forces from the transducer generated by the action of the electromagnet 17, and substituting that ratio into the functional relationship between the magnitude of the dynamic pressure of the fluid flow and the amplitude of the vortex signals from the transducer, the dynamic pressure of the fluid flow is accurately determined from the amplitude of the vortex signal generated by the transducer, which algorithm carried out by a microprocessor determines the dynamic pressure of the fluid flow accurately independent of the drift in electronic and mechanical characteristics. Once the fluid velocity is determined from the frequecny of the vortex signal and the dynamic pressure is determined from the amplitude of the vortex signal, the volume flow rate, mass flow rate and the fluid density can be derived therefrom. For the fluid with known density, the volume and mass flow rates measured by the vortex shedding flowmeter of the present invention can be used to check the validity and accuracy of the data by checking the two flow rates against each other.

Depending on the operational and economic requirements dictated by the flowmeter users, the vortex shedding flowmeter of the present invention shown in FIG. 1 through 5 may include one, two or all three features; the fluid velocity measurement, dynamic pressure measurement and real time calibration means employed in the dynamic pressure measurement. For example, the vortex shedding flowmeter measuring the fluid velocity only need not include the means for measuring the amplitude of the vortex signals and means for the real-time calibration thereof. An economic model of the vortex shedding flowmeter measuring volume and mass flow rates may include means for measuring the frequency and amplitude of the signals from the transducer without the calibration electromagnet and accessories thereof. In FIGS. 6-9 and 26-28, there are illustrated modified versions of the embodiment shown in FIG. 1. In those FIGS. 6-9 and 26-28, the means for real-time calibration including the calibration electromagnet corresponding to the element 17 shown in FIG. 1 is omitted for the sake of simplicity in the illustration, as the inclusion of such a calibration means has become a matter of design after the teachings provided by the embodiment shown in FIG. 1.

In FIG. 6 there is illustrated a cross section of an embodiment of the vortex shedding flowmeter of the present invention including a vortex detecting wing sensor 37 with one extremity 38 secured to the wall of the flow passage in part and connected to the force receiving member 39 of a transducer 40 in part of a mechanical coupling 41, while the other extremity 42 of the wing sensor 37 is unsecured. The sensitivity of the wing sensor 37 can be enhanced by including a slit 43 starting from the secured extremity 38 and extending towards the unsecured extremity 42, that partially separates the wing sensor into a first portion connected to the transducer 40 and a second portion secured to the wall of the flow passage. The unsecured extremity 42 of the wing sensor 37 may be simply secured to the wall by a mechanical coupling in order to increase the resonance frequency of the wing sensor. The mechanical coupling 41 should be a nonswiveling type, even though a swiveling type works satisfactorily. It should be mentioned that the portion of the wing sensor 44 connected to the transducer 40 may be replaced with a simple elongated member extending from the half of the wing sensor 37 adjacent to the unsecured extremity 42.

In FIG. 7 there is illustrated a cross section of an embodiment of the vortex shedding flowmeter of the present invention, which has a wing sensor 45 including a first portion 46 secured to the wall of the flow passage at both extremities and a second portion 47 connected to the force receiving member 48 of a transducer 49 by a mechanical coupling 50. The two portions 46 and 47 of the wing sensor 45 are partially separated from one another by a pair of slits 51 and 52 respectively starting from the two extremities of the wing sensor 45 and extending towards the midsection thereof. One of the two extremities of the wing sensor 45 may be simply secured to the wall of the flow passage by a swivel or hinge joint instead of the fixed securing as shown in the illustrated embodiment. The portion 47 of the wing sensor 45 may be replaced with a simple elongated member extending from a midsection of the wing sensor 45. The extending section of the portion 47 of the wing sensor 45 extending in a direction opposite to the transducer 49 may be omitted.

In FIG. 8 there is illustrated a cross section of an embodiment of the vortex shedding flowmeter of the present invention that has a wing sensor 53 secured to the wall of the flow passage in part at one extremity 54 opposite to the transducer 55, which wing sensor is partially separated into two portions 56 and 57 by a slit 58 starting from the partially secured extremity 54 and extending towards the unsecured extremity 59. The portion 57 of the wing sensor is connected to the force receiving member 60 of the transducer 55 by a mechanical coupling 61 at the other extremity opposite to one extremity 54 partially secured to the wall of the flow passage.

In FIG. 9 there is illustrated a cross section of an embodiment of the vortex shedding flowmeter of the present invention that has a wing sensor 62 secured to the wall of the flow passage at one extremity 63, wherein part of the wing sensor 62 is terminated at a midsection thereof. The force receiving member 64 comprising a wing surface itself extends from the transducer 65 towards the truncated midsection of the wing sensor 62, whereat the extremity of the force receiving wing member 64 is coupled to the truncated midsection of the wing sensor 62 by a mechanical coupling 66. The unsecured extremity 67 of the wing sensor 62 may be simply secured to the wall of the flow passage by a swivel or hinge joint. The force receiving wing member 64 extending from the transducer 65 may be a simple elongated member instead of a wing construction.

In FIG. 10 there is illustrated a cross section of an embodiment of the vortex shedding flowmeter of the present invention that has a vortex generator-sensor. The vortex generator-sensor 68 is a two piece bluff body wherein the first piece 69 extending from the wall of the flow passage towards the central axis of the flow passage is coupled in an in-line relationship to the second piece 70 extending from the thin flange of the transducer 71 by a mechanical coupling 72 providing a flexible midsection for the bluff body 68. The two pieces 69 and 70 constituting the bluff body may be a hollow member so that the two piece bluff body has a high resonance frequency, while it has a high flexibility at the midsection thereof. The transducer 71 is the type illustrated in FIGS. 2, 4 and 5. The second piece 70 is an integral part of the thin flange included in the transducer container vessel, wherefrom it extends. The secured extremity of the first piece 69 and the anchored extremity of the second piece 70 may include sections of reduced cross section area 73 and 74 in order to provide an additional flexibility to the bluff body.

In FIG. 11 there is illustrated another view of the vortex generator-sensor 68 comprising the two piece bluff body, which is isolated from the flow-meter body. The securing extremity 75 and the transducer container vessel 71 must be fixedly secured to the flowmeter body or wall of the flow passage by welding, clamping or threaded fastening.

In FIG. 12 there is illustrated a cross section of the vortex generator-sensor shown in FIG. 11, which cross section is taken along plane 12—12 as shown in FIG. 11. The core of the bluff body is hollowed out in order to reduce the inertia of the bluff body. The vortices shed from the two sides of the bluff body in an alternating pattern exert lateral fluid dynamic forces on the bluff body in an alternating mode, which are detected by the transducer.

Figure 13:
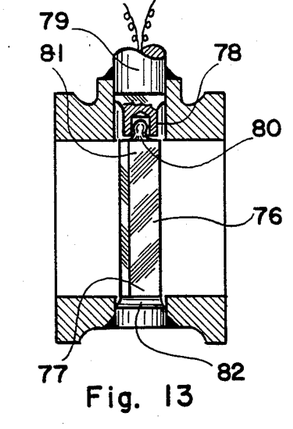
FIG. 13 illustrates an embodiment of the vortex shedding flowmeter of the present invention that has one piece bluff body secured to the wall of the flow passage at one extremity and connected to the force receiving member of a transducer by a mechanical coupling at the other extremity.

In FIG. 13 there is illustrated a cross section of an embodiment of the vortex shedding flowmeter of the present invention which has a vortex generator-sensor comprising a single piece bluff body 76, that is secured to the flowmeter body at one extremity 77 and connected to the force receiving member 78 of a transducer 79 by a mechanical coupling 80 at the other extremity 81. The secured extremity 77 may include a section 82 with a reduced cross section area that provides an additional flexibility for the bluff body. The bluff body 76 may have a hollow construction in order to reduce the inertia thereof.

Figure 14:
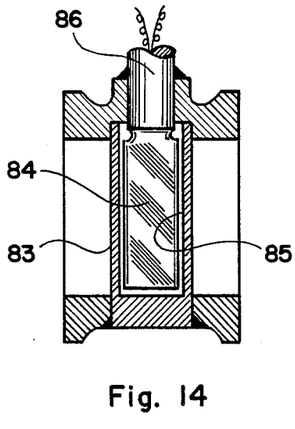
FIG. 14 illustrates an embodiment of the vortex shedding flowmeter of the present invention including a bluff body with a cavity that houses a pressure detecting panel extending from a transducer.

In FIG. 14 there is illustrated a cross section of an embodiment of the vortex shedding flowmeter of the present invention that has a vortex generator-sensor comprising a bluff body 83 rigidly disposed across a cross section of the flow passage and a pressure detecting panel 84 housed in a cavity 85 included in the bluff body 83. The pressure detecting panel 84 is fixedly anchored to the thin flange of the transducer container vessel 86 and extends therefrom. The transducer container vessel 86 contains the transducer elements as shown in FIGS. 2, 4 and 5. The two side walls of the cavity 85 has a plurality of pressure communicating openings as shown in FIGS. 18-22 and, consequently, the two side surfaces of the pressure detecting panel 84 are respectively exposed to the fluid pressures on the two sides of the bluff body. The fluctuating fluid pressure created by the vortices shed from the two sides of the bluff body in an alternating pattern exerts alternating lateral forces on the pressure detecting panel, which are detected by the transducer.

Figure 15:
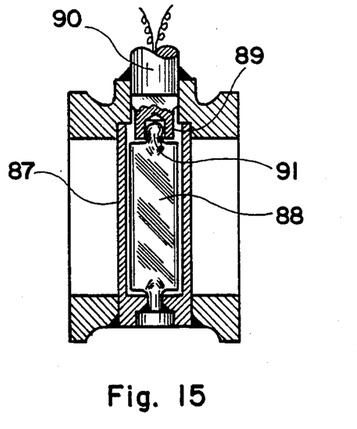
FIG. 15 illustrates an embodiment of the vortex shedding flowmeter of the present invention with a bluff body including a cavity that houses a pressure detector panel secured to the bluff body at one extremity and connected to a transducer by a mechanical coupling at the other extremity.

In FIG. 15 there is illustrated a cross section of an embodiment of the vortex shedding flowmeter of the present invention that has a vortex generator-sensor comprising a bluff body 87 and a pressure detecting panel 88 housed in a cavity included in the bluff body. The pressure detecting panel 88 is secured to the bluff body or the flowmeter body at one extremity and connected to the force receiving member 89 of the transducer 90 by a mechanical coupling 91 at the other extremity.

Figure 16:
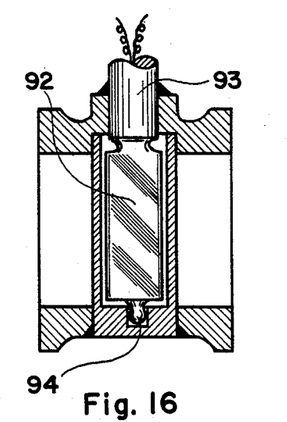
FIG. 16 illustrates an embodiment of the vortex shedding flowmeter of the present invention with a bluff body including a cavity that houses a pressure detector panel extending from a transducer which is secured to the bluff body at the extremity thereof.

In FIG. 16 there is illustrated a cross section of an embodiment of the vortex shedding flowmeter of the present invention having essentially the same construction as the embodiment shown in FIG. 14 with one exception being that the extremity of the pressure detecting panel 92 opposite to the transducer 93 is secured to the bluff body or flowmeter body by a mechanical coupling 94. Instead of the swivel type mechanical coupling 94, the secured extremity may be anchored by a fixed securing such as a weld or threaded fastening.

Figure 17:
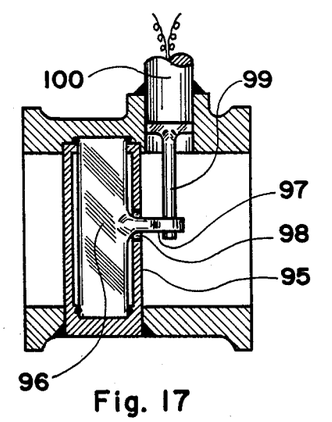
FIG. 17 illustrates an embodiment of the vortex shedding flowmeter of the present invention with a bluff body including a cavity that houses a pressure detector panel secured to the bluff body at both extremities and connected to the force receiving member of a transducer by an extrusion extending from a midsection thereof.

In FIG. 17 there is illustrated a cross section of an embodiment of the vortex shedding flowmeter of the present invention that has a vortex generator-sensor comprising a bluff body 95 and a pressure detecting panel 97 housed in a cavity included in the bluff body 95. The pressure detecting panel 96 secured to the bluff body or flowmeter body at both extremities includes an extension 97 extending from a midsection thereof and through a hole 98 disposed through the downstream side wall of the cavity, which extension is connected to the pressure receiving member 99 of the transducer 100.

Figure 18:
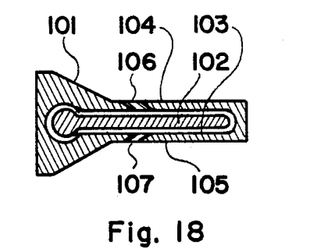
FIG. 18 illustrates a cross section of an embodiment of the combination of the bluff body and pressure detector panel.

In FIG. 18 there is illustrated a cross section of an embodiment of the vortex generator-sensor comprising a bluff body 101 and pressure detecting panel 102 housed in a cavity 103 included in the bluff body 101. The two side walls 104 and 105 of the cavity 103 respectively include two sets of pressure communicating openings 106 and 107 disposed following the length of the bluff body. The vortex generator-detector of the construction shown in FIGS. 18-22 may be employed in the construction of the vortex shedding flowmeters shown in FIGS. 14-17.

Figure 19:
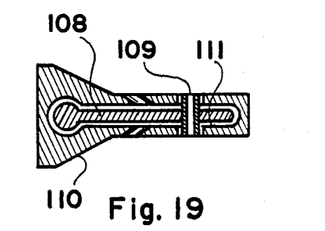
FIG. 19 illustrates a cross section of another embodiment of the combination of the bluff body and pressure detector panel.

In FIG. 19 there is illustrated a cross section of another embodiment of the vortex generator-sensor having essentially the same construction as the embodiment shown in FIG. 18 with one exception. The pressure detecting panel 108 includes a set of small diameter tubings 109 affixed thereto and extending thereacross, which tubings are disposed following the length of the bluff body 110. The two extremities of these tubings 109 respectively extend through the two sets of clearance holes disposed through the two side wall of the cavity 111 housing the pressure detecting panel 108.

Figure 20:
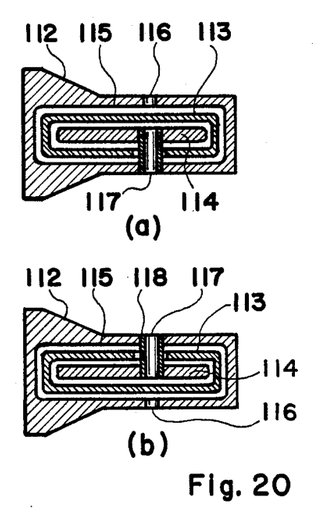
FIG. 20 illustrates a cross section of a further embodiment of the combination of the bluff body and pressure detector panel.

In FIG. 20 there is illustrated two cross sections of a further embodiment of the vortex generator-sensor comprising a bluff body 112, a hollow pressure detecting member 113 and a planar core 114 affixed to the bluff body 112. Each side wall of the cavity 115 housing the pressure detecting member 113 includes a set of blank holes 116 and a set of holes 117 provided by a plurality of small diameter tubings 118 extending through the one side wall of the cavity 115 and the planar core member 114 in a leak-proof fitting. The tubings 118 affixed to one side wall of the cavity 115 and to the planar core member 114 extends through clearance holes disposed through one side wall of the hollow pressure detecting member 113. The holes 116 and 117 are disposed in an alternating pattern following the length of the bluff body 112 as shown in FIG. 21.

Figure 21:
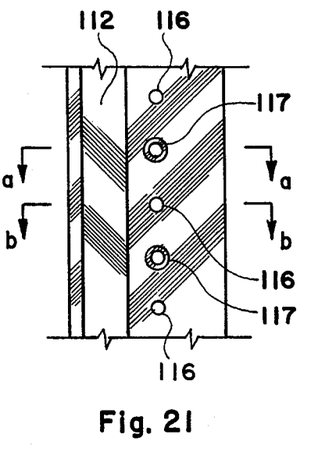
FIG. 21 illustrates another view of the embodiment shown in FIG. 20.

In FIG. 21 there is illustrated another view of the vortex generator-sensor shown in FIG. 20, which shows one side thereof. The cross sections (a) and (b) shown in FIG. 20 are respectively taken along plane a—a and b—b. The vortex generator-sensor shown in FIGS. 20 and 21 has a high sensitivity as it has dual panels loaded by the fluctuating fluid pressure associated with the vortex shedding.

Figure 22:
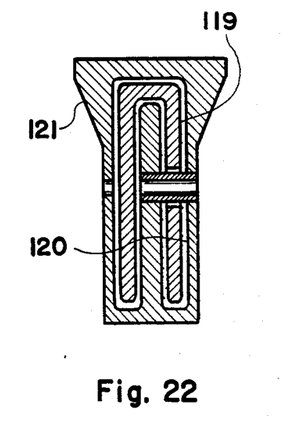
FIG. 22 illustrates a cross section of yet another embodiment of the combination of the bluff body and pressure detector panel.

In FIG. 22 there is illustrated a cross section of yet another embodiment of the vortex generator-sensor having a construction similar to the embodiment shown in FIGS. 20 and 21. In place of the flattened tubular pressure detecting member, a pressure detecting member 119 of a channel shape is housed within a chanel shaped cavity 120 included in the bluff body 121.

Figures 23, 24, 25, 26, 27, 28:
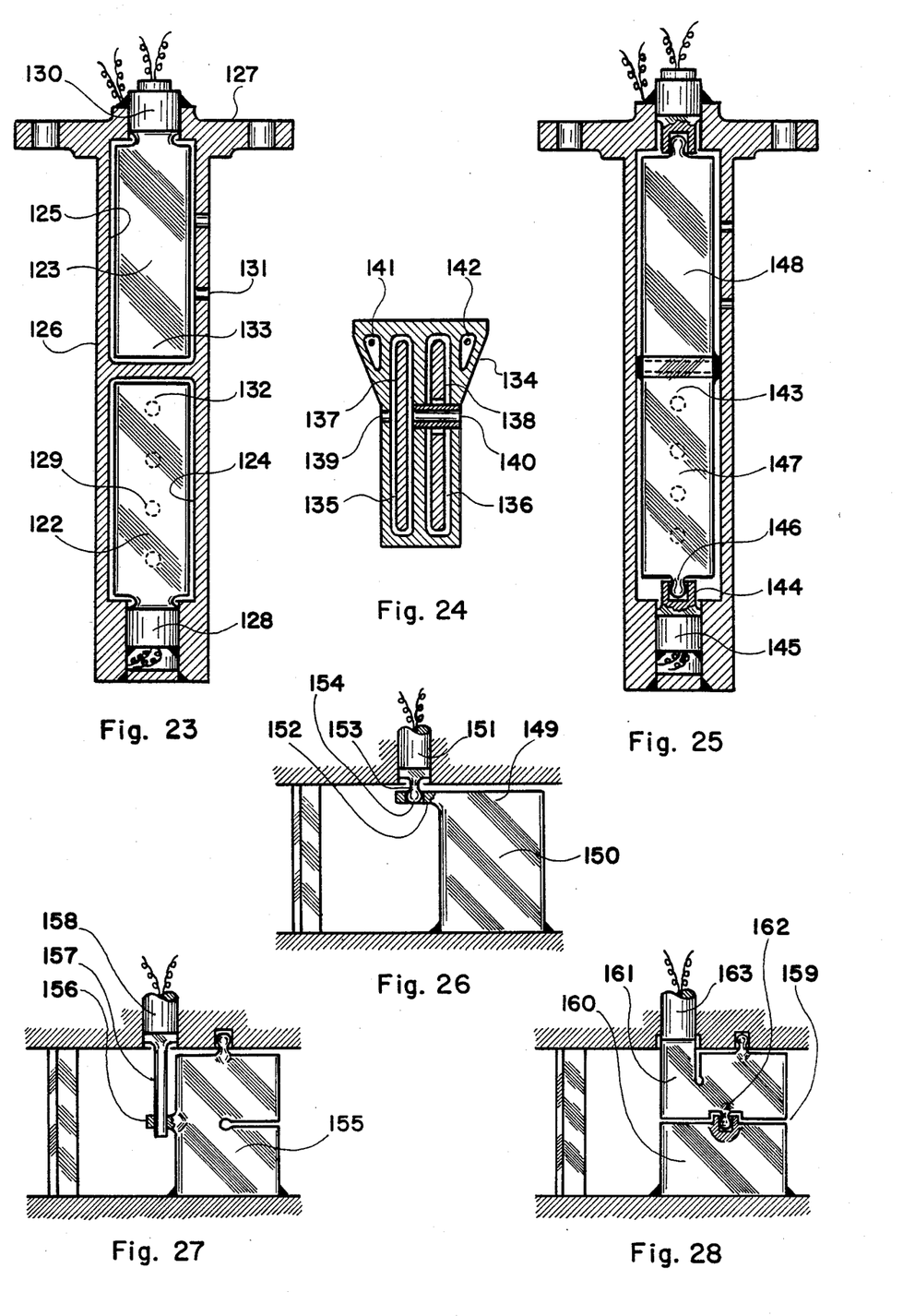
FIG. 23 illustrates a cross section of an embodiment of the insertion type bluff body that includes a real and dummy pressure detector panels respectively extending from two transducers.
FIG. 24 illustrates a cross section of another embodiment of the insertion type bluff body including a real and dummy pressure detecting panels.
FIG. 25 illustrates a cross section of a further embodiment of the insertion type bluff body including a real and dummy pressure detector panels.
FIG. 26 illustrates an embodiment of the vortex detecting wing that is a modified version of the embodiment shown in FIG. 1.
FIG. 27 illustrates an embodiment of the vortex detecting wing that is a modification of the embodiment shown in FIG. 7.
FIG. 28 illustrates an embodiment of the vortex detecting wing that is a modification of the embodiment shown in FIG. 9.

In FIG. 23 there is illustrated a cross section of an embodiment of the insertion type vortex generator-sensor that has a pair of the pressure sensing panels 122 and 123 respectively housed in a pair of cavities 124 and 125 included in the bluff body 126 extending from an anchoring flange 127. The real pressure detecting panel 122 extending from the thin flange of the first transducer container vessel 128 is housed in the first cavity 124 including a plurality of the pressure communicating openings 129 disposed through both side walls of the cavity 124, while the dummy pressure detecting panel 123 extending from the thin flange of the second transducer container vessel 130 is housed in the second cavity 125 that does not have any pressure communicating openings open to the two sides of the bluff body 126. The second cavity 125 has vent openings 131 open to up- or downstream side surface of the bluff body 126. The unsupported extremities 132 and 133 of the two pressure detecting panels may be secured to the bluff body structure fixedly or simply. Although it is not necessary, it is desirable to match the inertia of the two pressure detecting panels 122 and 123, whereby the two pressure detecting panels 122 and 123 react to the mechanical vibrations of the bluff body in the same way. The real pressure detecting panel 122 detects the vortex signals as well as the mechanical vibration noises, while the dummy pressure detecting panel 123 detects only the mechanical vibration noises. The electric signals from the two transducers 128 and 130 are combined in such a way that the mechanical vibration noises are canceled therebetween and pure vortex signals are obtained. The cross section of the combination of the bluff body 126 and the real pressure detecting panel 122 may be similar to one of those cross sections shown in FIGS. 18–22. Instead of the two cavities respectively housing the real and dummy pressure detecting panels in a tandem or length-or-length arrangement as shown in the particular illustrated embodiment, those cavities can be arranged into a side-by-side arrangement as shown in FIG. 24.

In FIG. 24 there is illustrated a cross section of another embodiment of the vortex generator-sensor taken along a plane perpendicular to the length of the bluff body 134, that includes a pair of cavities 135 and 136 disposed in a side-by-side parallel arrangement, which cavities respectively house the real and dummy pressure detecting panels 137 and 138. The first cavity 135 housing the real pressure detecting panel 137 includes a first set of pressure communicating openings 139 open to one side of the bluff body 134 and a second set of pressure communicating openings 140 open to the other side of the bluff body 134, which are provided by a plurality of small diameter tubings extending through the clearance holes disposed through the dummy pressure detecting panel 138 and affixed to the wall separating the two cavities 135 and 136 and to the side wall of the cavity 136 at the two extremities thereof, respectively. The holes 141 and 142 are for routing electrical wires when the two transducers are disposed at the two opening extremities of the vortex generator-sensor.

In FIG. 25 there is illustrated a cross section of a further embodiment of the insertion type vortex generator-sensor having essentially the same construction as the embodiment shown in FIG. 23 with one exception being each of the pressure detecting panels is secured to the bluff body structure at one extremity 143 and connected to the force receiving member 144 of the transducer 145 by a mechanical coupling 146 at the other extremity. The real and dummy pressure detecting panels 147 and 148 may be disposed in a side-by-side arrangement as shown in FIG. 24 instead of the length-to-length arrangement of the particular illustrated embodiment.

In FIG. 26 there is illustrated an embodiment of the vortex shedding flowmeter of the present invention that has essentially the same construction as the embodiment shown in FIG. 1 minus the calibration electromagnet, wherein one exception is the unsecured extremity 149 of the wing sensor 150 that is now connected to the transducer 151 by an extension 152 connected to the force receiving member 153 of the transducer 151 by a mechanical coupling 154.

In FIG. 27 there is illustrated a cross section of an embodiment of the vortex shedding flowmeter of the present invention which is a modified version of the embodiment shown in FIG. 7. The wing sensor 155 secured to the wall of the flow passage at the two extremities has an extension 156 extending from a midsection thereof, which is connected to the force receiving member 157 of the transducer 158.

In FIG. 28 there is illustrated a cross section of an embodiment of the vortex shedding flowmeter of the present invention, which is a modified version of the embodiment shown in FIG. 9. The wing sensor 159 comprises two planar members 160 and 161 of equal chord length connected to one another at a midsection of the wing sensor by a mechanical coupling 162, wherein the first planar member 160 extends from the wall of the flow passage, while the second planar member 161 extends from the thin flange of the transducer 163.

While the principles of the invention have now been made clear by the illustrative embodiments, there will be immediately obvious to those skilled in the art many modifications and equivalents in structures, arrangements, proportions, elements and materials which are particularly adapted to the specific working environments and operating conditions in the practice of the invention without departing from those principles. It is not desired to limit the invention to the particular illustrated embodiments shown and described and, accordingly, all suitable modifications and equivalents may be resorted to falling within the scope of the inventions as defined by the claims which follow.

The embodiments of the invention, in which an exclusive property or priviledge is claimed, are defined as follows:

1. A device for measuring fluid flow comprising in combination:
   (a) a body including a flow passage;
   (b) a bluff body of elongated shape disposed across a first cross section of the flow passage;
   (c) a planar member disposed at least partially across a second cross section of the flow passage generally parallel to the bluff body on a plane generally parallel to the central axis of the flow passage wherein at least one extremity of the planar member is secured to the body at least in part; and
   (d) a transducer including a force receiving member connected to a laterally deflective portion of the planar member by a mechanical coupling that transmits stress from the planar member to the force receiving member and produces a bending moment in the force receiving member;

wherein alternating lift force on the planar member associated with vortices shed from the bluff body generates a fluctuating electrical signal from the transducer as a measure of fluid flow moving through the flow passage, wherein the volume flow rate of the fluid is determined from the frequency of the fluctuating electric signal and the mass flow rate of the fluid is determined from a combination of the frequency and amplitude of the fluctuating electrical signal.

2. A combination as set forth in claim 1 wherein said combination includes means for exerting a lateral force of known magnitude on the planar member in pulses and means for measuring the amplitude of electrical signal from the transducer generated by said lateral force, wherein the ratio of the magnitude of said lateral force to the amplitude of said electrical signal generated by said lateral force is used as a calibration standard in determining the mass flow rate of the fluid from the combination of the frequency and amplitude of the fluctuating electrical signal.

3. A device for measuring fluid flow comprising in combination:
 (a) a body including a flow passage;
 (b) a bluff body of elongated shape disposed across a first cross section of the flow passage;
 (c) a planar member disposed at least partially across a second cross section of the flow passage generally parallel to the bluff body on a plane generally parallel to the central axis of the flow passage wherein at least one extremity of the planar member is secured to the body at least in part; and
 (d) a transducer including a force receiving member connected to a laterally deflective portion of the planar member by a mechanical coupling that transmits stress from the planar member to the force receiving member and produces a bending moment in the force receiving member, wherein the force receiving member extends from a thin wall of a container vessel housing at least one Piezo electric element pressed against the thin wall;
wherein alternating lift force on the planar member associated with vortices shed from the bluff body generates fluctuating electrical signals as a measure of fluid flow moving through the flow passage.

4. A device for measuring fluid flow comprising in combination:
 (a) a body including a flow passage;
 (b) a bluff body of elongated shape disposed across a first cross section of the flow passage;
 (c) a planar member disposed at least partially across a second cross section of the flow passage generally parallel to the bluff body on a plane generally parallel to the central axis of the flow passage wherein at least one extemity of the planar member is secured to the body at least in part; and
 (d) a transducer including a force receiving member connected to a laterally deflective portion of the planar member by a mechanical coupling that transmits stress from the planar member to the force receiving member and produces a bending moment in the force receiving member, wherein the planar member includes at least one slit partially separating said deflective portion from secured portion of the planar member;
wherein alternating lift force on the planar member associated with vortices shed from the bluff body generates fluctuating electrical signals as a measure of fluid flow moving through the flow passage.

5. A device for measuring fluid flow comprising in combination:
 (a) a body incuding a flow passage;
 (b) a bluff body of elongated shape disposed across a first cross section of the flow passage;
 (c) a planar member disposed at least partially across a second cross section of the flow passage generally parallel to the bluff body on a plane generally parallel to the central axis of the flow passage wherein at least one extremity of the planar member is secured to the body at least in part; and
 (d) a transducer including a force receiving member connected to a laterally deflective portion of the other extremity of the planar member opposite to said one extremity by a mechanical coupling that transmits stress from the planar member to the force transmitting member and produces a bending moment in the force receiving member, wherein the planar member includes a slit partially separating said deflective portion connected to the force receiving member from secured portion of the planar member;
wherein alternating lift force on the planar member associated with vortices shed from the bluff body generates fluctuating electrical signals as a measure of fluid flow moving through the flow passage.

6. A device for measuring fluid flow comprising in combination:
 (a) a body including a flow passage;
 (b) a bluff body of elongated shape disposed across a first cross section of the flow passage;
 (c) a planar member disposed at least partially across a second cross section of the flow passage generally parallel to the bluff body on a plane generally parallel to the central axis of the flow passage wherein at least one extremity of the planar member is secured to the body at least in part; and
 (d) a transducer including a force receiving member connected to a deflective portion of said one extremity of the planar member partially secured to the body by a mechanical coupling that transmits stress from the planar member to the force receiving member and produces a bending moment in the force receiving member, wherein the planar member includes a slit partially separating one portion of the planar member connected to the force receiving member from the other portion of the planar member secured to the body;
wherein alternating lift force on the planar member associated with vortices shed from the bluff generates fluctuating electrical signals as a measure of fluid flow moving through the flow passage.

7. A device for measuring fluid flow comprising in combination:
 (a) a body including a flow passage;
 (b) a bluff body of elongated shape disposed across a first cross section of the flow passage;
 (c) a planar member disposed at least partially across a second cross section of the flow passage generally parallel to the bluff body on a plane generally parallel to the central axis of the flow passage wherein at least one extremity of the planar member is secured to the body at least in part, wherein at least a portion of one extremity of the planar member and one portion of the other extremity of the planar member opposite to said one extremity are secured to the body; and
 (d) a transducer including a force receiving member connected to a deflective portion of said the other extremity of the planar member by a mechanical coupling that transmits stress from the planar member to the force receiving member and produces a bending moment in the force receiving member;
wherein alternating lift force on the planar member associated with vortices shed from the bluff body generates fluctuating electrical signals as a measure of fluid flow moving through the flow passage.

8. A combination as set forth in claim 7 wherein the planar member includes at least one slit partially separating one portion of the planar member connected to the force receiving member from the other portion secured to the body.

9. A device for measuring fluid flow comprising in combination:
   (a) a body including a flow passage;
   (b) a bluff body of elongated shape disposed across a first cross section of the flow passage;
   (c) a planar member disposed at least partially across a second cross section of the flow passage generally parallel to the bluff body on a plane generally parallel to the central axis of the flow passage wherein at least one extremity of the planar member is secured to the body at least in part; and
   (d) a transducer including a force receiving member connected to a midsection of the planar member by a mechanical coupling that transmits stress from the planar member to the force receiving member and produces a bending moment in the force receiving member;
wherein alternating lift force on the planar member associated with vortices shed from the bluff body generates fluctuating electrical signals as a measure of fluid flow moving through the flow passage.

10. A combination as set forth in claim 9 wherein both extremities of the planar member are secured to the body.

11. A combination as set forth in claim 10 wherein the planar member includes a slit disposed in a midsection thereof partially separating the planar member into two halves.

12. A device for measuring fluid flow comprising in combination:
   (a) a body including a flow passage;
   (b) a bluff body of elongated shape disposed across a first cross section of the flow passage;
   (c) a planar member disposed partially across a second cross section of the fluid passage generally parallel to the bluff body on a plane generally parallel to the central axis of the flow passage wherein one extremity of the planar member is secured to the body at least in part and the other extremity opposite to said one extremity is terminated in the middle of the flow passage; and
   (d) a transducer including a force receiving member connected to the terminated extremity of the planar member by a mechanical coupling that transmits stress from the planar member to the force receiving member and produces a bending moment in the force receiving member;
wherein alternating lift force on the planar member associated with vortices shed from the bluff body generates fluctuating electrical signals as a measure of fluid flow moving through the flow passage.

13. The combination as set forth in claim 12 wherein the force receiving member includes a planar section disposed generally parallel to the planar member and extending into the flow passage.

* * * * *